June 13, 1967  A. BEERBOWER ETAL  3,325,407
EMULSIFIABLE GLASS MOLD LUBRICANTS
Filed May 13, 1964
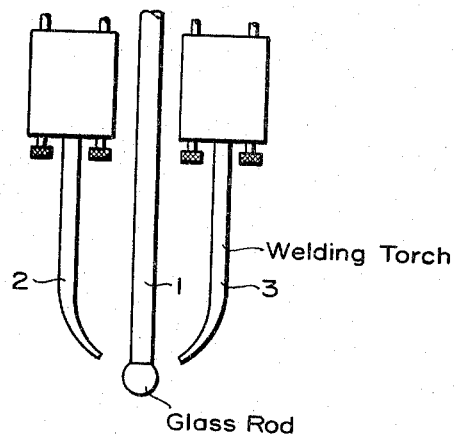
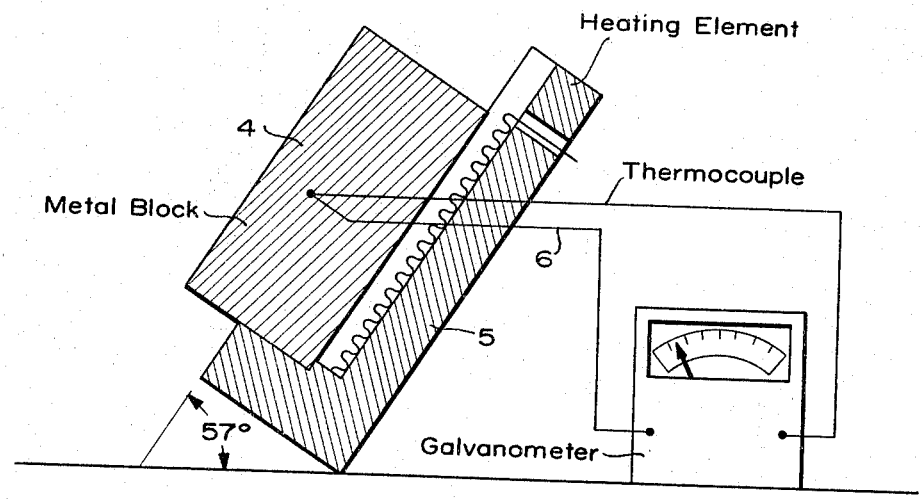
ALAN BEERBOWER
EDWARD L. KAYLE   Inventors
By   CECIL C. SCHMIDT
Patent Agent

United States Patent Office 3,325,407
Patented June 13, 1967

3,325,407
EMULSIFIABLE GLASS MOLD LUBRICANTS
Alan Beerbower, Westfield, and Edward L. Kayle, Colonia, N.J., assignors to Esso Research and Engineering Company, a corporation of Delaware
Filed May 13, 1964, Ser. No. 367,027
10 Claims. (Cl. 252—33.4)

This invention relates to compositions which are suitable for lubricating the molds used in forming shaped articles of glass. More particularly, this invention relates to oil-in-water emulsions formed from high molecular weight petroleum oils, which emulsions are useful for lubricating the metal molds (e.g. iron molds) used for molding glass. These lubricants prevent the molten glass from sticking to the metal mold.

Background

In molding glass bottles, etc., molten glass, at temperatures of about 1800° to 2200° F., is dropped into a split iron mold which is usually maintained at a temperature of about 700° to 1000° F., e.g. 870° F. The iron mold is then inverted, and compressed air is blown into the mold to spread the molten glass along the confines of the mold, thus shaping the glass. During this shaping period, the glass cools and begins to harden. The two halves of the mold are then separated, and the hot glass article is removed. Next, the two halves of the mold are again brought together, the interior of the mold is sprayed with a lubricant, and the process is repeated.

Molding operations of the type just described are frequently carried out in automatic molding machines, the more common of which utilize two molds. Each of these molds will operate on about a two second cycle so that the machine will produce a shaped glass article every second. The lubricant is usually sprayed into the mold through a spray head spraying over a 360° circle, which spray head is inserted into the depth of the assembled mold and then withdrawn while spraying. At the present time, hand swabbing of portions of the mold is often necessary to supplement the automatic application of the lubricant described above. Thus, when the mold machine operator detects that glass is sticking to a part of the mold, he will manually (i.e. by hand) swab that portion of the mold with additional lubricant. A typical commercial operation will involve hand swabbing of each mold at about every quarter or half hour.

Thus, there is a need for better lubricants than those now existing, which better lubricants would prevent the molten glass from sticking to the molds, thereby eliminating or reducing the number of slowdowns and hand swabbings. Desirably, such improved lubricants would also reduce the number of rejects, minimize fire hazards, etc.

At the present time, a wide variety of lubricants for glass molding are in use. Such lubricants range from simple, inexpensive mineral oils to the very expensive silicone preparations. Such lubricants frequently contain such diverse materials as graphite, molybdenum disulfide, boron nitride, high melting waxes, etc.

In general, any lubricant to be used in glass molds should have a boiling point high enough that intolerable amounts of the lubricant will not evaporate from the mold before the glass is added; it should not be decomposed to leave thick deposits on the mold surface; and it should have the necessary lubricating ability, including the ability to wet the mold and wet the glass. Ideally, such lubricants should be relatively inexpensive, and be easily transported from one location to another, e.g., from the manufacturer to the consumer. While many materials have the necessary boiling point and thermal stability, few have the additional ability to adequately lubricate a glass mold. For example, polyphenyl ethers are well known for their high boiling points and thermal stability, but they completely fail to effectively lubricate glass molds.

Discovery

It has now been discovered, and this discovery forms a basis for the present invention, that excellent lubricants having the desired characteristics for glass molding can be made from very high molecular weight (e.g. 690 molecular weight) petroleum oils. It has further been discovered that such oils, while having outstanding properties when used alone, are too viscous to be commercially significant at the present time (i.e. they are too viscous to be sprayed directly). Hydrocarbon solutions of these high molecular weight oils (e.g. 5–10 wt. percent of the high molecular weight oil mixed in a light mineral oil having a viscosity of 40 SUS at 210° F.) will give satisfactory lubrication, but are excessively smoky. This latter characteristic is of major importance. This smoke, which is also produced by all other known oil based lubricants, is sufficient to cause complaints by other employees working in the same well ventilated laboratory during test periods consuming 5–10 grams of oil, less than half of which evaporated. Opinions from the field confirm this observation.

Further efforts by the present inventors show that the elimination of smoke requires the substantial dilution of the high molecular weight oil with either a volatile solvent or water. Light naphtha, etc., cannot be tolerated because of fire hazards and chlorinated solvents, etc., cannot be tolerated because of toxicity. Thus, the only practical solution is to emulsify the high molecular weight oil in water. Repeated attempts to utilize conventional emulsifiers in the conventional manner, were unsuccessful, however. None were found to be sufficiently compatible with the high molecular weight oil to produce a commercially acceptable product.

It has now been further discovered that satisfactory oil-in-water emulsions can be prepared, provided that a portion of the high molecular weight oil, itself, is sulfonated. The resulting petroleum sulfonate is a higher molecular weight petroleum sulfonate than any known commercial product, and it is uniquely matched (in chemical structure) to the high molecular weight oil itself. The partially sulfonated high molecular weight petroleum oil, especially when fortified with certain additives, as later described, is very effective as an emulsifiable glass mold lubricant and is an extremely desirable product. It can be conveniently shipped to the consumer, and diluted there with from about 2 to 50 parts by volume of water, more usually from 3 to 25 parts of water by volume, e.g. 3.5 to 10 parts of water by volume. Stable emulsions can then be prepared by simple stirring or shaking of the water/oil mixture. The resulting product has been shown to be superior to a product prepared in the laboratory which is similar to three commercially available aqueous emulsion lubricants. The current unit cost of this novel product is much lower than that of the very fine silicone preparations. More of this product is required to give equivalent performance, but even then, the total cost is still significantly lower. Because of their high cost, the silicone lubricants are not nearly so widely used as are the known aqueous emulsions previously referred to. The novel products of the present invention are economically competitive with presently used aqueous emulsions, and offer significant performance advantages.

The high molecular weight oil

The high molecular weight petroleum oils most suited for use according to the present invention are those oils having an average molecular weight of about 550 to 900, more usually from 575 to 800, and preferably from 600–700. In this respect, bright stocks are especially desirable and have outstanding properties. These preferred oils are petroleum oils which are derived from the de-waxed and de-asphalted residuum of any crude oil. These bright stocks will ordinarily have a viscosity at 210° F. of from about 120 to 300 SUS. A typical preferred bright stock will have a boiling point above the molding temperature, e.g. a boiling range at atmospheric pressure of from about 900° F. (5 volume percent distilled over) to 1100° F. at 50-75 volume percent distilled over. These boiling points are measured according to ASTM method D-1160 at 1 torr and then converted to boiling points at atmospheric pressure. Two preferred bright stocks were found to have the following properties:

TABLE I.—PROPERTIES OF TWO PREFERRED BRIGHT STOCKS

|  | Bright Stock A (Coray 200 [1]) | Bright Stock B (2503 Bright Stock [1]) |
|---|---|---|
| Average molecular weight | 693 | 616 |
| Viscosity at 210° F., SUS | 208 | 154 |
| Flash point, open cup, ° F | 580 | 563 |
| ASTM pour point, ° F | +15 | +15 |
| Viscosity Index | 79.5 | 101.5 |
| Carbon residue | 0.82 | 0.70 |
| ASTM Distillation (converted from 1 torr): | | |
| IBP | 750 | 877 |
| 5% | 923 | 943 |
| 50% | 1,060 | 1,070 |
|  | ([2]) | ([3]) |

[1] Product designations used by Humble Oil & Refining Co. Both oils shown in Table I cracked on further heating.
[2] 74% at 1,117.
[3] 65% at 1,110.

The sulfonation

The sulfonation of a portion of the high molecular weight oil can be accomplished by any one of a number of known sulfonation techniques. While the present invention is not known to be dependent in any way on the manner of preparation, it is affected by the severity of the sulfonation technique employed. Due to the wide variety of compounds found in the high molecular weight oils of this invention, relatively mild sulfonation is desirable to avoid the production of intolerable amounts of petroleum di-sulfonic acids, which acids are lost as sludge. Quite possibly a mixture of severely sulfonated oil and unsulfonated or mildly sulfonated oil would be satisfactory, but the use of mildly sulfonated oil, per se, would seem to be preferred. By way of example, only, one method of preparation which has proved to be effective is described below.

Seventy parts by weight of a bright stock (Coray 200; see Table I for its properties) was intimately mixed with 30 parts by weight of a hydrocarbon solvent (Varsol #3 sold by Humble Oil & Refining Co. and comprising about 3.0 wt. percent aromatics and 97 wt. percent saturated hydrocarbons, having a specific gravity of about 0.77 and boiling in the range of from about 320° to 350° F. (ASTM-D-86)), and 5.5 parts by weight of 89% $H_2SO_4$. The purpose of the solvent was to improve fluidity both during and after sulfonation. This three component mixture was then stirred in an open container while heating to 140° F. The mixture was held at that temperature for 4 hours. Then it was centrifuged to remove spent acid. A portion of the acid treated oil was then neutralized with sodium hydroxide and ashed. The ash content was determined to be 0.61 which indicated that about 10% of the oil had been converted to sulfonic acids.

While the oil (both sulfonated and unreacted) may be separated from the solvent prior to use, it has been found that this is not necessary or really desirable due to the high viscosity of the oil which makes handling a nuisance. It is quite feasible and desirable to use the crude solvent/oil mixture (after centrifuging, etc.) in the glass mold lubricating compositions of the present invention. In fact, this is quite preferred, since the solvent improves the lubricant's properties, facilitates handling, and aids in emulsification.

The crude sulfonated oil/solvent mixtures will usually contain from about 20 to 40 weight percent solvent and from about 0.5 to 10 wt. percent of the high molecular weight sulfonates, with the remainder being unreacted high molecular weight oil. As used hereinafter, the term "Acid oil" refers to these crude mixtures, as well as similar mixtures prepared by other methods wherein the relative amounts of the ingredients are substantially the same.

Suitable solvents

Solvents which can be used in accordance with the present invention include, but are not limited to, solvents such as; virgin naphthas from paraffinic crudes, refined naphthas of paraffinic or naphthenic nature, normal and branched chain paraffin hydrocarbons, etc. These solvents can be generically characterized as saturated or near saturated materials which are not sulfonatable under the reaction conditions employed. Preferably, their flash point is above 100° F. and they have a low viscosity such that not over 40 weight percent solvent is required to give an "acid oil" viscosity of less than 400 SUS at 100° F. Preferred solvents are solvent naphthas (e.g. Varsol #3, a $SO_2$ extracted virgin naphtha sold by Humble Oil & Refining Co.) and solvent alkylates (e.g. Isopar G, an isobutane alkylate available from the same supplier).

Other ingredients

As previously indicated, many conventional emulsifiers, when used alone or in certain combinations, do not effectively emulsify the high molecular weight oils of this invention. Moreover, partial sulfonation of the high molecular weight oil of this invention is not, alone, enough. It is absolutely necessary to supplement the partially sulfonated oil with certain additional emulsifiers, since the sulfonates produced by partial sulfonation of the oil are too low in hydrophilic/lipophilic balance (HLB) to serve alone. Consequently, some higher HLB material must be added to raise the overall HLB to the optimum HLB of about 12. The HLB is defined as twenty times the ratio of the water-wetted (hydrophilic) weight in the surfactant molecule to the total molecular weight. See Griffin, W. C., Jour, Soc. Cosmets. Chemists, vol. 1, p. 311 (1949). Thus, a surfactant containing 30% hydrophilic groups (e.g. polyoxyethylene) would have a HLB of 6.

The classes of surfactants required to boost the high molecular weight sulfonates (i.e. acid oil) into a favorable emulsification situation are:

*Class 1.*—This class includes the high HLB materials (high when contrasted with the acid oil) such as triethanolamine (which is essentially 20 HLB). High HLB amines, e.g. triethanolamine, serve to neutralize free high molecular weight sulfonic acids produced by the sulfonation and also act as emulsifiers. The neutralization can be accomplished with conventional bases, e.g. sodium or potassium hydroxide, but the results are less satisfactory since these bases are ordinarily used in the form of their water solutions and also produce water as a by-product of the neutralization. This water tends to separate and/or causes the acid oil to be cloudy. The amines are free from these problems. Presumably, the neutralization could be done with any non-volatile alkyl or alkylol amine (but not aryl amines). The average HLB could then be raised by adding additional (the same or different) high HLB (e.g. nonyl phenol plus 83% oxyethylene). Thus, class 1 can be met by:

(a) using an alkylol amine having a boiling point (at atmospheric pressure) of over 300° F. in an amount sufficient to neutralize free sulfonic acid and raise the HLB to 12. Suitable alkylolamines includes ethanolamine, diethanolamine, triethanolamine; the corresponding propanol and butanol amines; mixed ethanol and propanol amines; etc., or (b) by using a non-volatile alkyl or alkylol amine or alkali base as a neutralizing agent and then adding a high HLB surfactant to bring the average HLB to 12. Suitable examples include those shown in group "a" and dihexylamine, dicyclohexylamine, lauryl amine and myristyl amine, as well as the amines of other fatty alcohols. Alkali metal bases, e.g. sodium and potassium hydroxide, may be used as neutralizing agents; or (c) by using the polyoxyethylene adducts of alcohols, fatty acids, phenols and alkyl phenols (which adducts contain at least 60% ethylene oxide) in combination with a neutralizing agent from group "b."

*Class 2.*—This class includes the surfactants having a medium HLB (e.g. HLB of 10-14) and medium molecular weight. These surfactants (usually petroleum sulfonates) are used to increase the total emulsifier content to 5-40%, e.g. 10-25% of the total weight of the oil concentrate. If the high molecular weight oil is sulfonated to a high enough concentration, the need for surfactants of this class will be reduced or eliminated. Frequently, the direction of operation will be controlled by the economics of additional sulfonation when compared with the cost of the needed medium molecular weight sulfonate. Suitable medium HLB and medium molecular weight sulfonates include the petroleum sulfonates having an average molecular weight of, for example, 400 to 520. One desirable sulfonate of this type is a sodium petroleum sulfonate having an average molecular weight of 500 (sold by Humble Oil and Refining Co. as Acto 639; it contains 63% active ingredient as sold, with the remainder being diluent).

*Class 3.*—This class includes low molecular weight alcohols or coupling agents. They serve to create disorder in the surfactant monolayer, thereby causing the surfactant to become more effective. It appears that the coupling agent creates gaps in the surfactant monolayer, which gaps are then filled with water and/or oil. Cyclohexanol is extremely effective, while isopropanol, mono-, di- and tri-ethylene glycol, glycerol and butane-1,3-diol, when used alone, are unsatisfactory. Possible substitutes for cyclohexanol are t-butanol, t-amyl alcohol and alkyl cyclohexanols.

In addition to these required materials, various other additive materials may optionally be included in the compositions of this invention in varying amounts. Examples of such additives include dry lubricants such as graphite, molybdenum disulfide, boron nitride, and silicon-containing materials; oxidation inhibitors such as 2,6-ditertiary butyl 4-methyl phenol; additives for prevention of bacteria or fungus growth such as trihydromethyl-nitromethane; etc.

The concentrate

The oil concentrates of the present invention will generally consist of from 60-95 weight percent, more usually from 75-90 weight percent, e.g. 80-86 weight percent acid oil, with the balance being the required emulsifiers. If it is desired to include other additives, e.g. graphite, etc., they will be added to the basic concentrate.

Test apparatus and procedure

To demonstrate the compositions of the present invention and to compare them with other compositions, a test system was constructed as shown in the attached drawing. That drawing is a diagrammatic illustration of the test apparatus.

Referring now to the drawing, a solid glass rod 1 (e.g. ⅛ inch diameter) is fed through the flame produced by a pair of opposed welding torches 2 and 3 which are fed with acetylene and oxygen. The flame melts the glass, and gobs of molten glass then fall 2½" onto a block of cast iron 4. Block 4 measures 2 inches long x 1 inch wide x ½ inch thick and is maintained at an angle of 57° from the horizontal. Metal block 4 is heated by means of electrical heating element 5 which is placed under and supports block 4. Thermocouple 6, located within block 4 and 1/16 of an inch below the tilted upper surface of block 4, measures the temperature of block 4. The time for the individual gobs of molten glass to slide down one inch of block 4 is measured automatically by means of photocells (not shown). A first photocell means (not shown) is focused on the initial point of contact of the glass and metal block 4. This photocell starts an electric timer (not shown) upon the interruption of a light beam by the gob of glass. A second photocell means is focused one inch down the length of block 4 from the initial point of contact and stops the timer when the glass gob interrupts its light beam. This arrangement thereby determines, accurately, the time interval between the initial contact of the gob of glass with the block and the subsequent passage of the molten glass gob one inch down the block.

A testing procedure, utilizing the apparatus just described, was carried out as follows:

The cast iron block was polished before each series of tests using 320 grit silicon carbide paper to remove any lubricant, etc. from prior tests. The block was then heated to 950° F., held there for 10 minutes and then cooled to room temperature. This was done to condition the metal surface with a uniform metal oxide coating. The block was again heated and maintained at a temperature of 870° F. The flames from the torches were adjusted so that the glass gobs were at a temperature of about 2150° F. as they broke loose from the feed rod. This results in a gob temperature of approximately 1850° F. at the time of initial contact of the gob with the cast iron. The lubricant to be evaluated was sprayed on the iron block at the rate of 50 milligrams per square inch in approximately 1.3 seconds, starting 2 seconds before each glass gob falls on the block. A new spray was made before each gob of glass fell on the block, with the time of travel down the block, i.e. parting time, recorded for each gob. Sticking in these experiments was defined as a time of 0.5 second or greater for the glass gob to slide between the first and second photocell means. When sticking occurred, the stuck glass was removed, the block was again sprayed, and the procedure was repeated.

The results thus obtained were reported in terms of reliability and parting time. Reliability is defined as the percentage of times out of a series of ten tests in which the gob of glass satisfactorily moved down the block after a spray application. Parting time is defined as the average time required for the drop to travel one inch down the block.

Examples and comparative tests

The present invention will be more clearly understood by reference to the following examples which include a preferred embodiment. Unless otherwies indicated, all parts are parts by weight and all percentages are weight percentages.

EXAMPLE 1

An oil concentrate of an emulsifiable lubricant was prepared from an acid oil prepared by the soulfonation technique previously described. The acid oil consisted of about 63% unreacted bright stock (Coray 200) having a molecular weight of 690, 7% sulfonated bright stock and 30% hydrocarbon solvent (Varsol #2). The concentrate had the following composition:

| | Percent (about) |
|---|---|
| Acid oil | 82 |
| Acto 639 | 12 |
| Triethanolamine | 1 |
| Cyclohexanol | 5 |
| Total | 100 | and was prepared by simple mixing of the ingredients. Acto 639 is a commercially available sodium sulfonate of 500 molecular weight and has a 63% dry sulfonate content.

This concentrate was added to water (about 1 volume of concentrate to 5 volumes of water) and shaken. It immediately formed a stable emulsion with only a trace of creaming after remaining in a quiescent state for 24 hours.

EXAMPLE 2

An oil concentrate of an emulsifiable lubricant was prepared in the same manner as described in Example 1. The oil concentrate had the following composition:

| | Percent |
|---|---|
| Acid oil | 85 |
| Mixed emulsifier | 12 |
| Cyclohexanol | 3 |
| Total | 100 |

The mixed emulsifier which was used was a prepared emulsifier concentrate (#3766) and consisted of 76.5 wt. percent of Acto 636 (a 63% active commercially available sodium sulfonate of 465 molecular weight), 20.3 wt. percent sodium naphthenate, and 3.2 wt. percent diethylene glycol.

This oil concentrate was added to water (one volume of concentrate to 5 volumes of water) and shaken. It immediately formed a stable emulsion with only a trace of creaming after remaining in a quiescent state for 24 hours.

The oil-in-water emulsions of this invention were compared with various other products in the test apparatus previously described. The test results are shown below in Table II.

The data in Table II make it clear that samples 3, 9 and 10 are not useable because of their low reliability numbers. Samples 5, 6 and 7 are not useful in high-speed molding machines because of their excessive parting times. Sample 8 is typical of past practices in the art, and presents health as well as fire hazards. Thus, samples 1, 2 and 4 are the only satisfactory materials. However, sample 4 is very expensive (by comparison with the cost of samples 1 and 2) and has, therefore, been of very limited use in the glass industry.

To further illustrate the unique nature of the inventive compositions, a number of non-inventive samples were prepared using conventional emulsifiers in lieu of sulfonating the high molecular weight oil. Based on a requirement of less than 2% cream and no free oil or water, all such samples were unacceptable. Those results are shown in Table III.

TABLE III.—UNSUCCESSFUL LUBRICANT FORMULATIONS [1]

| Reference No. | Percent 500 M.W. Sulfonate (Acto 639) | Percent other emulsifier [2] | Coupling Agent | Reason for rejecting 8% oil-in-water emulsion |
|---|---|---|---|---|
| 3278-131-7 | 1.1 | 4.4 G-1086 / 4.4 G-1087 | Butyl cellosolve | 88% free water. |
| 3278-131-8 | 2.0 | 7.2 G-1087 / 0.8 G-3404 | do | 80% free water. |
| 3278-131-9 | 3.3 | 6.0 G-1087 / 0.7 G-3404 | 0.3% isopropanol | 75% free water. |
| 3278-131-10 | 3.0 | 5.5 G-1087 / 0.5 G-3404 | 1.0% isopropanol | No emulsification. |
| 3278-131-11 | 6.7 | 3.3 G-1087 | | Do. |
| 3278-131-12 | 6.0 | 3.0 G-1087 | 1% isopropanol | 80% free water. |
| 3278-131-13 | 6.0 | 3.0 G-1087 | do | Does not emulsify. |
| 3278-131-14 | 4.5 | 1.5 G-1087 | 4% isopropanol | 90% free water. |
| 3278-131-15 | 4.4 | 2.1 G-1087 | 3.5% isopropanol | Incompatible; cloudy. |
| 3278-131-16 | 5.0 | 5.0 G-1087 | | Do. |
| 3278-131-17 | 0.4 | 8.2 G-1087 / 0.8 G-3404 | | 10% cream, 90% free water. |
| 3278-131-17A | 0.4 | 8.2 G-1087 / 0.8 G-3404 | 0.4% isopropanol | 26% cream, 74% free water. |
| 3278-131-17B | 0.4 | 8.2 G-1087 / 0.8 G-3404 | 1% butyl cellosolve | 29% cream, 71% free water. |
| 3278-134-XIV | 2.0 | 3.0 G-1087 / 3.0 G-3404 | 2.0% CO-1087 / 2.0% CO-3404 | Incompatible; cloudy. |

[1] Based on acid oil consisting of 70% high molecular weight oil (Coray 200) and 30% solvent (Varsol).
[2] G-1086 is (46% polyoxyethylene) sorbitol septaoleate; G-1086 is (51% polyoxyethylene) sorbitol hexa-oleate; G-3404 is a polyoxyethylene ester/polyoxyethylene glyceride/alkyl aryl sulfonate blend; CO-530 is (53% polyoxyethylene) nonyl phenol; CO-430 is (43% polyoxyethylene) nonyl phenol.

Thus, it can be appreciated that the present compositions are both unique and unusually effective. Based on the data of Table III, the performance of the inventive compositions is truly astounding. They are very effective and economically attractive.

Although the present invention is primarily directed to lubricants useful in molding glass, the oil emulsions of this invention can be used for other purposes. For example, these lubricants can also be used in various die-casting operations to lubricate metal molds used for casting aluminum, zinc, etc. where they operate as mold release agents to prevent sticking. These lubricants may also be used for various other purposes, particularly those involving high temperature operations.

TABLE II

| Sample No. | Lubricant | Concentration | Dosage, mg./in.[2] | Reliability No. | Average Parting Time [1] (milliseconds) |
|---|---|---|---|---|---|
| 1 | Product of Example 1 | 18% emulsion | 54 | 100 | 38.5 |
| 2 | Product of Example 2 | do | 50 | 100 | 184.5 |
| 3 | Mineral Oil (40 SUS at 210° F.) | 100% | 25 | 0 | |
| 4 | Commercial Product A (emulsifiable silicone fluid) | 2% | 50 | 100 | 33.2 |
| 5 | Commercial Product B (emulsifiable wax) | 10% emulsion | 50 | 100 | 1,860 |
| 6 | Commercial Product C (emulsifiable mineral oil plus graphite) | 5% emulsion | 50 | 100 | 1,800 |
| 7 | Distilled Water | 100% | 54 | 25 | 2,000 |
| 8 | Bright Stock (Coray 200) | 5% in light mineral oil (Coray 40) | 29 | 100 | [2] 75 |
| 9 | Polyphenyl ether | 5% emulsion | 54 | 0 | |
| 10 | Methyl oleate | 6% in light mineral oil (Coray 40) | 28 | 0 | |

[1] Times greater than 500 indicate borderline sticking; times are averaged only for those gobs or drops which do not stick.
[2] Very smoky.

Having described our invention with a certain degree of particularity, it will be realized that numerous minor changes may be made by the routineer without departing from the true nature and scope of this invention as revealed by this disclosure and the appendant claims. The three-star headings used throughout this disclosure are not meant to be limiting, but are provided only as a convenience to the reader.

What is claimed is:

1. A liquid oil concentrate emulsifiable with 2 to 50 volumes of water per volume of said concentrate to thereby form an oil-in-water emulsion suitable for glass mold lubrication comprising
   (a) 80–86 parts by weight of acid oil; said acid oil comprising 20–40 weight percent inert solvent, 0.5–10 weight percent high molecular weight sulfonic acids, and the remainder being unreacted high molecular weight oil; said molecular weights each averaging from 600–700; and
   (b) 20–14 parts by weight of a mixture of surfactants, said mixture including a coupling agent selected from the group consisting of cyclohexanol, t-butanol, t-amyl alcohol and alkyl cyclohexanol, and as an emulsifying agent an emulsifier having a sufficiently high HLB to raise the average HLB of said oil concentrate to 12.

2. A liquid oil concentrate emulsifiable with 2 to 50 volumes of water per volume of concentrate to form an oil-in-water emulsion suitable for glass mold lubrication comprising
   (a) 60–95 parts by weight of acid oil; said acid oil comprising 20–40 weight percent inert solvent, 0.5–10 weight percent high molecular weight sulfonic acids, and the remainder being unreacted high molecular weight oil; said molecular weights each averaging from 550 to 900; and
   (b) 40–5 parts by weight of a mixture of surfactants, said mixture comprising cyclohexanol and sufficient emulsifier which is a high HLB surfactant to raise the average HLB of said oil concentrate to 12.

3. A concentrate as defined in claim 2 wherein
   (a) from 75–90 parts by weight of acid oil are present;
   (b) wherein the high molecular weights each average from 575–800; and
   (c) wherein from 25–10 parts by weight of the mixture of surfactants are present.

4. A concentrate as defined in claim 3 wherein said emulsifier is petroleum sulfonate having an average molecular weight of 400–520.

5. A concentrate as defined in claim 3 wherein said emulsifier is triethanolamine.

6. A lubricant suitable for use in glass molding operations which comprises an oil-in-water emulsion consisting essentially of the concentrate of claim 1 and water in a volume ratio of from 2–50 parts of water per one part concentrate.

7. A lubricant suitable for use in glass molding operations which comprises an oil-in-water emulsion consisting essentially of the concentrate of claim 2 and water in a volume ratio of from 2–50 parts of water per one part concentrate.

8. A lubricant suitable for use in glass molding operations which comprises an oil-in-water emulsion consisting essentially of the concentrate of claim 3 and water in a volume ratio of from 2–50 parts of water per one part concentrate.

9. A lubricant suitable for use in glass molding operations which comprises an oil-in-water emulsion consisting essentially of the concentrate of claim 4 and water in a volume ratio of from 2–50 parts of water per one part concentrate.

10. A lubricant suitable for use in glass molding operations which comprises an oil-in-water emulsion consisting essentially of the concentrate of claim 5 and water in a volume ratio of from 2–50 parts of water per one part concentrate.

References Cited

UNITED STATES PATENTS

| | | | |
|---|---|---|---|
| 2,717,265 | 9/1955 | Johnson | 252—33 X |
| 2,770,595 | 11/1956 | Jezl | 252—49.5 X |
| 2,841,554 | 7/1958 | Ambrose et al. | 252—49.5 X |
| 2,848,415 | 8/1958 | Logan | 252—33 |
| 2,865,957 | 12/1958 | Logan | 252—33 X |
| 3,028,335 | 4/1962 | Shamaiengar | 252—49.5 X |
| 3,039,969 | 6/1962 | Colucci et al. | 252—49.5 X |
| 3,052,629 | 9/1962 | Morrow et al. | 252—49.5 X |
| 3,071,554 | 1/1963 | Rue | 252—49.5 X |
| 3,135,693 | 6/1964 | Whitney et al. | 252—33 |

DANIEL E. WYMAN, *Primary Examiner.*

P. P. GARVIN, *Assistant Examiner.*